March 24, 1970 S. DUINKER 3,502,821

MAGNETIC HEAD HAVING MAGNETICALLY NARROW GAP
WITH WIDE GAP STRUCTURAL SUPPORT
Original Filed March 5, 1962

INVENTOR.
SIMON DUINKER
BY
Frank R. Trifari
AGENT

United States Patent Office 3,502,821

Patented Mar. 24, 1970

3,502,821

MAGNETIC HEAD HAVING MAGNETICALLY NARROW GAP WITH WIDE GAP STRUCTURAL SUPPORT

Simon Duinker, Hamburg, Germany, assignor, by mesne assignments, to U.S. Philips Corporation, New York, N.Y., a corporation of Delaware

Original application Mar. 5, 1962, Ser. No. 177,654. Divided and this application July 9, 1965, Ser. No. 470,935

Claims priority, application Netherlands, Apr. 7, 1961, 263,324

Int. Cl. G11b *5/12*

U.S. Cl. 179—100.2 3 Claims

ABSTRACT OF THE DISCLOSURE

A magnetic head with grooves for narrowing one face of the gap forming faces, the grooves being glass filled as is the gap for structural support and fusion of the mating surfaces.

This application is a divisional application of application Ser. No. 177,654, filed Mar. 5, 1962, now abandoned.

In the magnetic recording of video-frequency signals, track widths are used of from 150 to 350 microns. In order to be able to write such a narrow track, heads must be used having a correspondingly narrow bearing surface. So far, such heads have been manufactured by tapering a wider head, having a width of, for example, 1.5 mm. laterally on the side of the bearing surface and then enveloping it on the said side with enamel, both for mechanical strengthening and for preventing the magnetic tape from being cut to pieces by the head, and then grinding and polishing it so that the narrow ferrite bearing surface again appears but now laterally widened with enamel.

This method is difficult, time-consuming and costly, involving a high reject percentage due to breakage on tapering, because the cross-section of the ferrite a brittle material, is extremely small at the gap face, namely approximately 0.02 mm.$^2$. In addition, the magnetic resistance of the head is increased by tapering, which results in a low efficiency of the head.

An additional drawback of the known method is that, when the bearing surface is polished in order to reduce the gap depth to the desired value, the track width also is increased inevitably.

The object of the invention is to provide a method in which these drawbacks are mitigated.

In the method according to the invention, and also in the known methods for manufacturing magnetic heads, two ferrite plates are used as starting material which, at an earlier or later stage of the manufacture, are united to one assembly with the interposition of a thin gap-forming and adhering layer of high-melting, non-magnetic material, for example glass. See for example, U.S. Patent 3,024,318, assigned to the assignee of the present invention.

The invention is characterized in that in one of the faces of one of these two plates, before uniting the plates, one or more sets are made of two shallow grooves meeting one another at one of the edges of the face. The grooves are filled with non-magnetic strengthening material. Then, in the side face facing the side of the side edge, a V-shaped groove is ground and filled with non-magnetic material which groove extends parallel to that edge and in a distance therefrom which somewhat exceeds the desired gap-depth of the head. Now, so much of the said side face is ground away and/or polished away that the strips of the plate material which appear between every two layers of strengthening material collectively extending into that side face have a width which is equal to the desired width of the track to be written or read by the head.

In order that the invention may readily be carried into effect embodiments thereof will now be described more fully, by way of example, with reference to the accompanying drawing. In the drawing, FIG. 1 shows an isometrically drawn view of a ferrite plate, comprising 10 sets of two grooves which are filled with glass.

Figure 1:
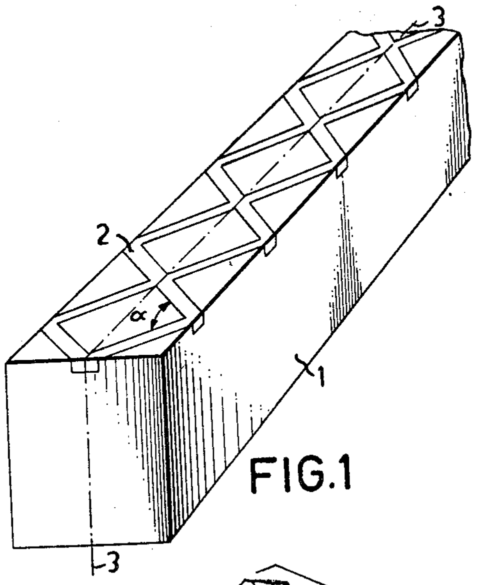

A ferrite block 1 is provided in one of its faces in the manner shown in FIG. 1 with a number of sets of two flat shallow grooves 2 which extend two by two in the side faces of the block. These grooves are filled with a non-magnetic strengthening material, for example glass, the coefficient of expansion of which is adapted to that of the ferrite and the softening point of which is high for example 700° C.

The block is then sawed in two along the dotted line 3 as a result of which two plates are obtained each comprising 5 sets of two grooves collectively extending in the side face. One head can be made from each set, so from the block shown consequently ten heads which number, however, may be extended with reasonable limits at will by starting from a longer block.

The angle at which the grooves intersect one another and which determines the apical angle of the tapered head is rather voluntary. Good results are obtained with angles of 60° and 90°, in which case the plate material consisted of a NiZn-ferrite sintered to compactness and the strengthening material of a lead glass, the softening of which started at approximately 650° C.

Figure 2:
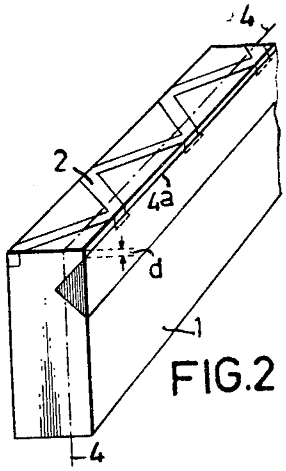
FIG. 2 shows a view of this plate after cutting through and after a V-shaped groove is provided.

As shown in FIG. 2 a V-shaped groove 4 is ground in the side wall of the plate in which the grooves 2 empty, the aperture angle of which preferably is approximately 90° and the upper side *4a* of which extends parallel to the upper side of the plate and at a distance *d* therefrom which is somewhat smaller than the desired gap height of the finished head. The depth of the groove 2 may be chosen somewhat larger, so that on grinding the V-shaped groove 4 part of the glass of the orifices of the grooves 2 is also ground away. Then the groove 4 is filled with a non-magnetic strengthening and adhering material, for example enamel, the coefficient of expansion of which is adapted to that of the plate materials and the softening point of which also is rather high, but preferably a little lower than that of the glass in the grooves 2.

Figure 3:
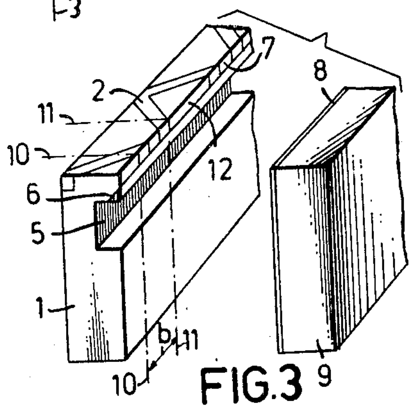
FIG. 3 shows the same view as FIG. 2 but after a rectangular groove has been made for the winding and after the plate has been ground and polished.

In order to be able to leave a counter plate to be combined with the plate 1 unprofiled, a rectangular groove 5 (FIG. 3) is ground in the side wall of the plate 1 to make room for the winding. It is preferable as shown in FIG. 3 to cause the upper side wall of this groove 5 in the drawing to coincide approximately with the central plane of the V-shaped groove 4, since then of the triangular strengthening beam cast in this groove the most useful half 6 with respect to the path of lines of force remains, while the winding is located as near as possible to the gap, which results in a compact structure and benefits the useful effect of the head. However, should this be desirable for some reason or other, the space for the winding may also be provided in the counter plate.

The side wall of the plate 1 is then ground flat and polished, which operation is continued until in the center of the glass of the orifices of the grooves 2 the plate material appears in the form of a narrow strip which becomes gradually wider. Polishing is discontinued as soon as the width of this strip has become equal to the desired width of the track to be written or read by the head, for example 200 microns. Then the plate is ready to be combined with the counter plate.

For that purpose, the polished side face of the plate is placed on the face of the ferrite counter plate 9 which is likewise polished but not profiled with the interposition of a thin adhering layer 8 (FIG. 3) consisting of glass or solder, after which the two plates are cemented together in known manner at high temperature. The thickness of the adhering layer 8 determines the desired gap length of the head and will amount to, for example, 2 microns. The temperature of cementing may naturally not be high so that the strengthening material tends to flow into the grooves 2 and/or 4.

Then the assembly of the plates 1 and 9 is cut off along the dotted lines 10 and 11 (FIG. 3) which are located symmetrically with respect to the strip 7 at a mutual distance *b* which is equal to the desired width of the track to be written with the finished head, for example 0.2 mm.

Figure 4:
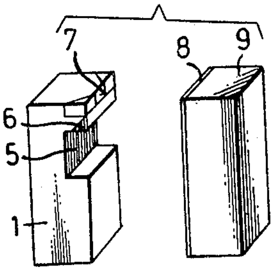
FIG. 4 is a view of the plate in combination with the associated counter plate.
Figure 5:
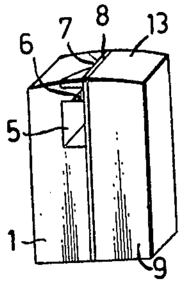
FIGS. 5 and 6 are views of complete head cut from the united plates.

Of the portion shown in FIG. 4 cut out of the plates in this manner, the bearing surface has to be treated so that it is given the desired shape (flat, cylindrical or curved) and that at the same time the gap 12 is given the desired height. If a cylindrical bearing surface is desired, it is ground and polished, for example, along the line 13 in FIG. 5. It is noted that in this operation only the gap height becomes gradually smaller but that the width of the strip 7 which determines the width of the track remains unchanged. As a result of the presence of the strengthening beam 6, effective gap heights (corresponding to the smallest remaining height of the magnetic material) can be realized in this manner, for example heights of 25 microns. In addition it is of importance that the effective magnetic cross-section of the circuit of the head is much larger everywhere than at the useful gap, so that the ratio of the magnetic resistances of the gap and the remainder of the said strip is as small as possible and consequently the efficiency of the head as large as possible. Dependent on the depth and height of the gap heads may be obtained with an efficiency of 75%.

Figure 6:
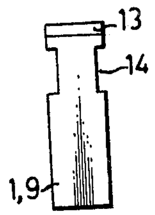

For some uses it is desirable to provide the winding within the contours of the head. In that case, grooves 14, as shown in FIG. 6 may be ground into the plates 1 and 9 at the height of the winding space 5.

What is claimed is:

1. A magnetic transducer comprising at least two circuit parts of ferrite magnetic material, one of said parts having a mating surface for ultimate fusion with the mating surface of the other one of said parts to form an effective gap, a first groove extending into the mating surface of one of said parts, a second groove extending into the mating surface of said one of said parts, said first and second grooves reducing the area of the mating surface of said one of said parts, thereby reducing the area defining said effective gap between said parts upon said ultimate fusion, said grooves and said effective gap each containing glass material, said glass material mechanically joining and bonding said two mating surfaces.

2. The combination of claim 1 further including a third glass filled groove extending along the mating surface of said one of said circuit parts, thereby further reducing the area defining the effective gap.

3. A glass bonded ferrite magnetic recording and reproducing head, comprising: a plurality of circuit parts of ferrite material, one of said parts being provided with a mating surface for ultimate fusion with the mating surface of another one of said plurality of parts, at least one of said mating surfaces having at least one recess therein, there being an effective gap between said two surfaces, said gap and at least a portion of said recess being filled with a glass material mechanically joining and bonding said two mating surfaces.

References Cited

UNITED STATES PATENTS

| | | | |
|---|---|---|---|
| 3,094,772 | 6/1963 | Duinker | 179—100.2 |
| 2,919,312 | 12/1959 | Rosenberger | 179—100.2 |
| 3,060,279 | 10/1962 | Harrison | 179—100.2 |
| 3,249,700 | 5/1966 | Duinker et al. | 179—100.2 |

BERNARD KONICK, Primary Examiner

V. P. CANNEY, Assistant Examiner

U.S. Cl. X.R.

29—603; 340—174.1; 346—74